United States Patent
Tanishima

(10) Patent No.: US 7,954,581 B2
(45) Date of Patent: Jun. 7, 2011

(54) DRIVE STATE SHIFT CONTROL APPARATUS AND METHOD FOR VEHICLE

(75) Inventor: Kaori Tanishima, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 713 days.

(21) Appl. No.: 11/796,896

(22) Filed: Apr. 30, 2007

(65) Prior Publication Data
US 2007/0278022 A1   Dec. 6, 2007

(30) Foreign Application Priority Data

May 2, 2006   (JP) ................................ 2006-128465

(51) Int. Cl.
*B60W 20/00* (2006.01)

(52) U.S. Cl. ................... 180/65.275; 903/913; 903/946; 477/5

(58) Field of Classification Search ............. 180/65.275, 180/65.6, 65.7; 903/909, 912, 913, 914, 903/945, 946; 477/2, 5, 6, 70, 77, 79, 86, 477/115, 116, 166
See application file for complete search history.

(56) References Cited

U.S. PATENT DOCUMENTS

| | | | | |
|---|---|---|---|---|
| 5,935,040 A * | 8/1999 | Tabata et al. | | 477/3 |
| 6,018,198 A * | 1/2000 | Tsuzuki et al. | | 290/17 |
| 6,455,947 B1 * | 9/2002 | Lilley et al. | | 290/40 C |
| 6,488,608 B2 * | 12/2002 | Yamaguchi et al. | | 477/3 |
| 6,595,895 B2 * | 7/2003 | Suzuki et al. | | 477/3 |
| 7,261,671 B2 * | 8/2007 | Ortmann et al. | | 477/6 |
| 7,282,008 B2 * | 10/2007 | Oshidari | | 477/4 |
| 7,347,803 B2 * | 3/2008 | Kobayashi et al. | | 477/5 |
| 7,360,616 B2 * | 4/2008 | Schiele | | 180/65.265 |
| 7,426,972 B2 * | 9/2008 | Tabata et al. | | 180/65.22 |

FOREIGN PATENT DOCUMENTS

| | | |
|---|---|---|
| JP | 09-089090 | 3/1997 |
| JP | 09-308008 | 11/1997 |
| JP | H11-082260 | 3/1999 |
| JP | 2000-103259 | 4/2000 |
| JP | 2004-293795 | 10/2004 |

* cited by examiner

*Primary Examiner* — John D Walters
(74) *Attorney, Agent, or Firm* — Young Basile

(57) ABSTRACT

A drive state shift control apparatus and method switches a hybrid drive (HEV) mode to an electric drive (EV) mode without engine stoppage shock or eliminates gearshifting shock in an electric vehicle. In response to a decrease in accelerator opening APO, a request for fourth-to-fifth upshift is issued, then request for HEV-to-EV mode shift is issued. At the time of the upshift, a direct clutch D/C is disengaged. At a first time interval after the mode shift is issued, a first clutch is disengaged. At a second time interval after the mode shift is issued, the engine begins to stop and the rotational speed of the motor-generator is controlled so that the speed falls to a predetermined rotational speed close to an after-gearshift rotational speed within a target shifting time interval. When the rotational speed reaches the predetermined rotational speed, a front brake Fr/B is engaged to perform a fourth-to-fifth upshift, and the torque of the motor is controlled so as to engage the one-way clutch smoothly.

19 Claims, 9 Drawing Sheets

FIG.5

| SHIFTING FRICTION ELEMENTS / GEARS | I/C | H&LR/C | D/C | R/B | Fr/B | LC/B | FWD/B | 1st/OWC | 3rd/OWC | FWD/OWC |
|---|---|---|---|---|---|---|---|---|---|---|
| FIRST |  | ● |  |  | ● | ● | ○ | ○ | ○ | ○ |
| SECOND |  |  | ○ |  | ● | ● | ○ |  | ○ | ○ |
| THIRD |  | ○ | ○ |  | ● |  | ○ |  | ○ |  |
| FOURTH | ○ | ○ | ○↓ |  | ↓ |  | ○ |  | ↓ |  |
| FIFTH | ○ | ○ |  |  | ○ |  | ○ |  | ○ |  |
| REVERSE |  | ● |  | ○ | ● |  |  | ○ | ○ |  |

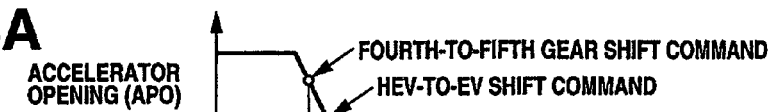
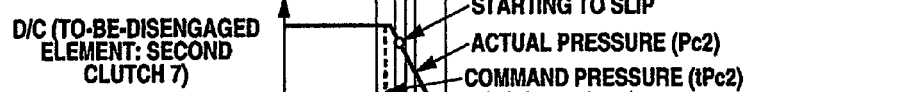
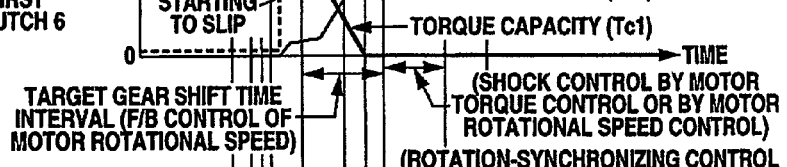
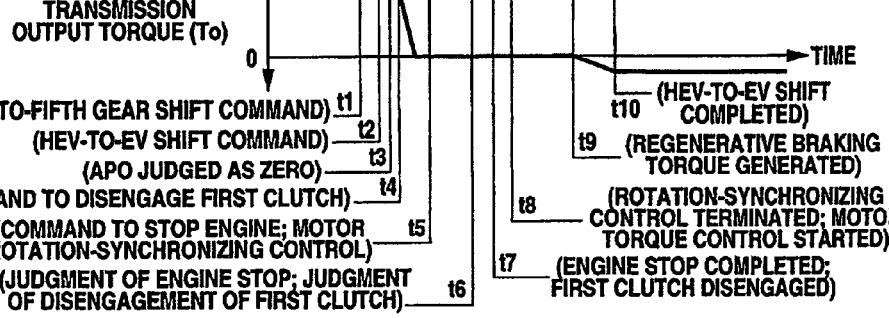

FIG.9

| | | |
|---|---|---|
| I | HEV MODE (DRIVE BY ENGINE OR BY ENGINE AND MOTOR)<br>↓<br>GEAR SHIFT REQUEST (4 → 5)<br>↓<br>START TO DISENGAGE D/C IN RESPONSE TO GEAR SHIFT REQUEST. | 1  6  5  D/C  8<br>ENG—∣—MG—∥—⊗<br>            3 |
| II | ENGINE STOP REQUEST (HEV → EV)<br>↓<br>START TO DISENGAGE FIRST CLUTCH AFTER TIME INTERVAL TM1 IN RESPONSE TO ENGINE STOP REQUEST. | 1  6  5  D/C  8<br>ENG—∦—MG—∥—⊗<br>            3 |
| III | • CARRY OUT ENGINE STOP (FUEL CUT, F/C) AFTER TIME INTERVAL TM2 IN RESPONSE TO ENGINE STOP REQUEST;<br>• START MOTOR ROTATIONAL SPEED CONTROL IN RESPONSE TO F/C, AND COMPLETE GEAR SHIFT OPERATION WITHIN TARGET GEAR SHIFT TIME INTERVAL; AND<br>• PRECHARGE AND PUT ON STANDBY Fr/B. | 1  6  5  Fr/B  8<br>ENG—∦—MG—∦—⊗<br>            3 |
| IV | • START MOTOR TORQUE CONTROL IN RESPONSE TO ATTAINMENT OF TARGET MOTOR ROTATIONAL SPEED ±α; AND<br>• COMPENSATE MOTOR TORQUE FOR ONE OF ESTIMATED TORQUE OF ENGINE AND TORQUE CAPACITY OF FIRST CLUTCH WHICH IS SELECTED DEPENDING ON STATE OF FIRST CLUTCH, TO ACHIEVE TARGET OUTPUT TORQUE.<br>∗ COMPENSATE FOR ESTIMATED TORQUE OF ENGINE, UNTIL FIRST CLUTCH STARTS TO SLIP AFTER ENGAGEMENT (Te < Tc1); AND<br>∗ COMPENSATE FOR TORQUE CAPACITY OF FIRST CLUTCH, UNTIL FIRST CLUTCH IS DISENGAGED AFTER STATING TO SLIP (Te > Tc1). | 1  6  5  Fr/B  8<br>ENG—∥—MG—∣—⊗<br>            3 |

—∥—: DISENGAGED    —∦—: SLIPPING    —∣—: ENGAGED

DRIVE STATE SHIFT CONTROL APPARATUS AND METHOD FOR VEHICLE

CROSS-REFERENCE TO RELATED APPLICATION

This application claims priority from Japanese Patent Application Serial No. 2006-128465, filed May 2, 2006, which is incorporated herein in its entirety by reference.

TECHNICAL FIELD

The invention relates generally to a hybrid vehicle capable of running with power from a motor-generator in addition to an engine and an electric vehicle capable of running with power from a motor-generator only.

BACKGROUND

Hybrid vehicles have an electric drive (EV) mode, in which the hybrid vehicle travels only by power from the motor-generator, and a hybrid drive (HEV) mode, in which the hybrid vehicle can travel by power from both the engine and the motor-generator. Hitherto, various types of hybrid driving devices used in hybrid vehicles have been proposed.

Japanese Patent Application Publication No. 11-082260 shows one type of such a hybrid drive system. The hybrid drive system disclosed therein includes a motor-generator disposed between an engine and a transmission as a result of connecting an output shaft of the engine and an input shaft of the transmission. A first clutch connects the engine to the motor-generator so that they can be separated from each other. A second clutch connects an output shaft of the transmission and the motor-generator so that they can be separated from each other.

When the first clutch is disengaged, and the second clutch is engaged, the hybrid vehicle including the hybrid driving device is put in the electric drive (EV) mode, in which the hybrid vehicle travels only by power from the motor-generator. When the first and second clutches are both engaged, the hybrid vehicle including the hybrid driving device is put in the hybrid drive (HEV) mode, in which the hybrid vehicle can travel by power from both the engine and the motor-generator.

BRIEF SUMMARY

Embodiments of a drive state shift control apparatus for an electric and a hybrid vehicle and methods are taught herein. One example of a drive state shift control apparatus for a vehicle comprises a motor-generator, a unidirectional engagement element disposed between the motor-generator and the driving wheel configured for automatic engagement in response to driving torque in one direction and a controller. The controller is operable to control a rotational speed of the motor-generator so that a rotational speed of an upstream side of the unidirectional engagement element in a direction of driving power transmission substantially conforms to a rotational speed of a downstream side thereof when the unidirectional engagement element is engaged in response to a shift in a driving power transmission path.

The disclosure also teaches controllers for a drive state shift control apparatus for a vehicle. The vehicle includes a motor-generator and a unidirectional engagement element disposed between the motor-generator and the driving wheel configured for automatic engagement in response to driving torque in one direction. One embodiment of the controller comprises means for shifting a driving power transmission path and means for controlling a rotational speed of the motor-generator so that a rotational speed of an upstream side of the unidirectional engagement element in a direction of driving power transmission substantially conforms to a rotational speed of a downstream side thereof when the unidirectional engagement element is engaged in response to the shift in the driving power transmission path.

One embodiment of a drive state shift control method for a vehicle such as that previously described comprises shifting a driving power transmission path and controlling a rotational speed of the motor-generator so that a rotational speed of an upstream side of the unidirectional engagement element in a direction of driving power transmission substantially conforms to a rotational speed of a downstream side thereof when the unidirectional engagement element is engaged in response to shifting the driving power transmission path.

BRIEF DESCRIPTION OF DRAWINGS

The description herein makes reference to the accompanying drawings wherein like reference numerals refer to like parts throughout the several views, and wherein:

FIG. 5 is an engagement logic diagram showing selected gears of the automatic transmission of FIG. 4 in relation to combinations of engagement of shifting friction elements in the automatic transmission;

FIGS. 8A through 8I are collectively referred to as FIG. 8 and illustrate an operation time chart of a drive state shift controlling device including an HEV-to-EV mode shift and a fourth-to-fifth upshift carried out by the integrated controller of the control system of FIG. 6; and FIG. 9 is a diagram showing another expression of the operation time chart of the drive state shift controlling device of FIG. 8.

DETAILED DESCRIPTION OF EMBODIMENTS OF THE INVENTION

Shifts in drive state of the above-described hybrid vehicle include mode shifts between the electric drive mode (EV mode) and the hybrid drive mode (HEV mode), gear shifts of the transmission in parallel with mode shifts and gear shifts in one of the electric drive mode (EV mode) and the hybrid drive mode (HEV mode).

The transmission may include a unidirectional engagement element such as a one-way clutch that transmits only to the driving wheels a driving torque in the direction of rotation of the engine. When the transmission selects a power transmission path (gear) on which the unidirectional engagement element is disposed, the unidirectional engagement element may shift from a disengaged state into an engaged state through a shift in drive state of the hybrid vehicle. When the shift is rapid, an engagement shock occurs in the unidirectional engagement element. This can adversely affect the drive "feel" of the driver during a drive state shift of the hybrid vehicle.

If torque on the output side of the unidirectional engagement element changes from a negative value to a positive value during the above drive state shift of the hybrid vehicle, the engagement shock in the unidirectional engagement element is larger so that the driver may notice the shift.

Conventionally, there is no technique for reducing such engagement shock in such a unidirectional engagement element during a drive state shift of the hybrid vehicle.

Accordingly, embodiments of the invention taught herein provide control for the suppression of such engagement shock in a unidirectional engagement element by suitably controlling the torque and rotational speed of the motor-generator. In the disclosed embodiments, the rotational speed of the motor-generator is controlled so that the motor-generator rotational speed conforms close to a target value after a drive state shift. This quickly brings the unidirectional engagement element into a state ready for engagement. In a subsequent stage, the motor-generator is controlled to engage the unidirectional engagement element smoothly.

The following describes embodiments of the invention in detail with reference to the accompanying drawings.

Figure 1:
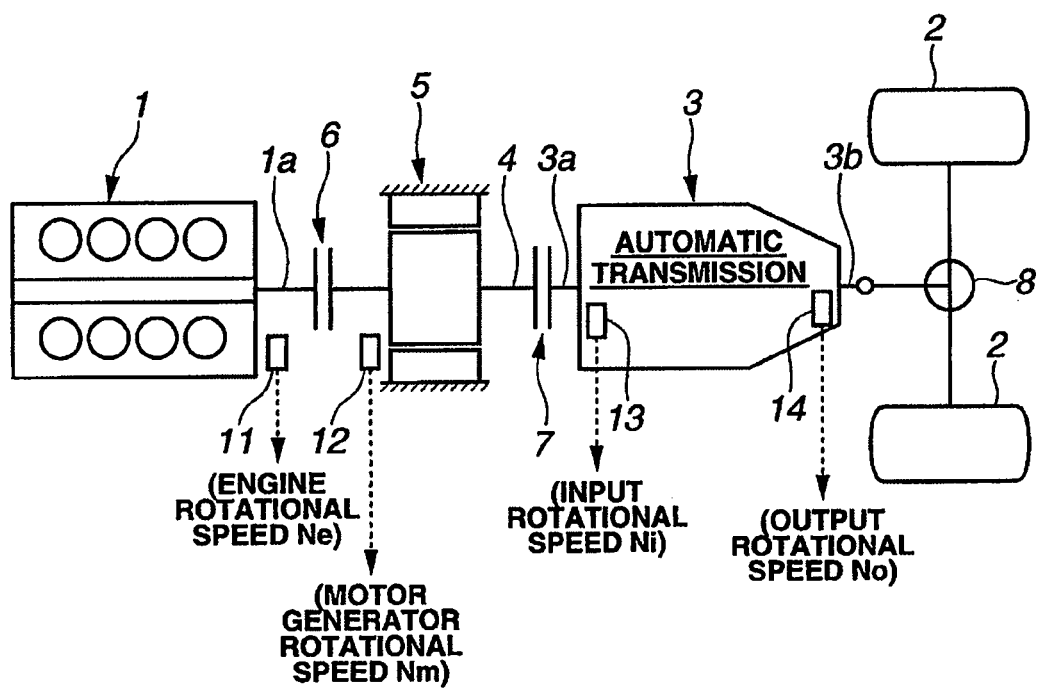
FIG. 1 is a schematic plan view of a hybrid vehicle powertrain to which a drive state shift controlling apparatus according to an embodiment of the invention is applicable.

FIG. 1 shows a powertrain of a rear wheel drive hybrid vehicle, which includes a drive state shift controlling device according to an embodiment of the invention. In the hybrid vehicle powertrain of FIG. 1, an automatic transmission 3 is disposed in tandem behind an engine 1 in the front-back direction of the vehicle, as in common rear wheel drive vehicles.

Disposed between engine 1 and automatic transmission 3, the motor-generator 5 operates as an electric motor or as an electric generator. A first clutch 6 is inserted between motor-generator 5 and engine 1, more specifically between shaft 4 and the engine crank shaft 1a. First clutch 6 selectively connects and disconnects engine 1 to and from motor-generator 5.

Here, torque transfer capacity of the first clutch 6 can be changed continuously or in steps. The first clutch 6 is, for example, a wet-type multi-plate clutch having a torque transfer capacity varied by continuously controlling the flow rate and pressure of a clutch operating fluid with a linear solenoid valve.

A second clutch 7 is inserted between the motor-generator 5 and automatic transmission 3, more specifically between the shaft 4 and a transmission input shaft 3a. Second clutch 7 selectively connects and disconnects motor-generator 5 to and from automatic transmission 3. As in the case of first clutch 6, torque transfer capacity of the second clutch 7 can be changed continuously or in steps. The second clutch 7 is, for example, a wet-type multi-plate clutch having a torque transfer capacity varied by continuously controlling the flow rate and pressure of a clutch operating fluid with a linear solenoid valve.

The automatic transmission 3 can be the same as the one described from pages C-9 to C-22 in "Description of Skyline New Model Car (CV35)" issued by Nissan Motor Co., Ltd., in January, 2003. A transmission path (shift gear) is determined by selectively engaging and disengaging a plurality of transmission friction elements (such as clutches and brakes) and combining the engagements and disengagements of the transmission friction elements. Thus, the automatic transmission 3 changes the speed of rotation from the input shaft 3a at a gear ratio in accordance with the selected gear and outputs the resulting rotation to an output shaft 3b. The output rotation is distributed and transmitted to the left and right rear wheels 2 by a differential gear unit 8 to cause the vehicle to travel. Of course, the automatic transmission 3 may be a continuous variable transmission (CVT) in addition to the described stage transmission.

Figure 4:
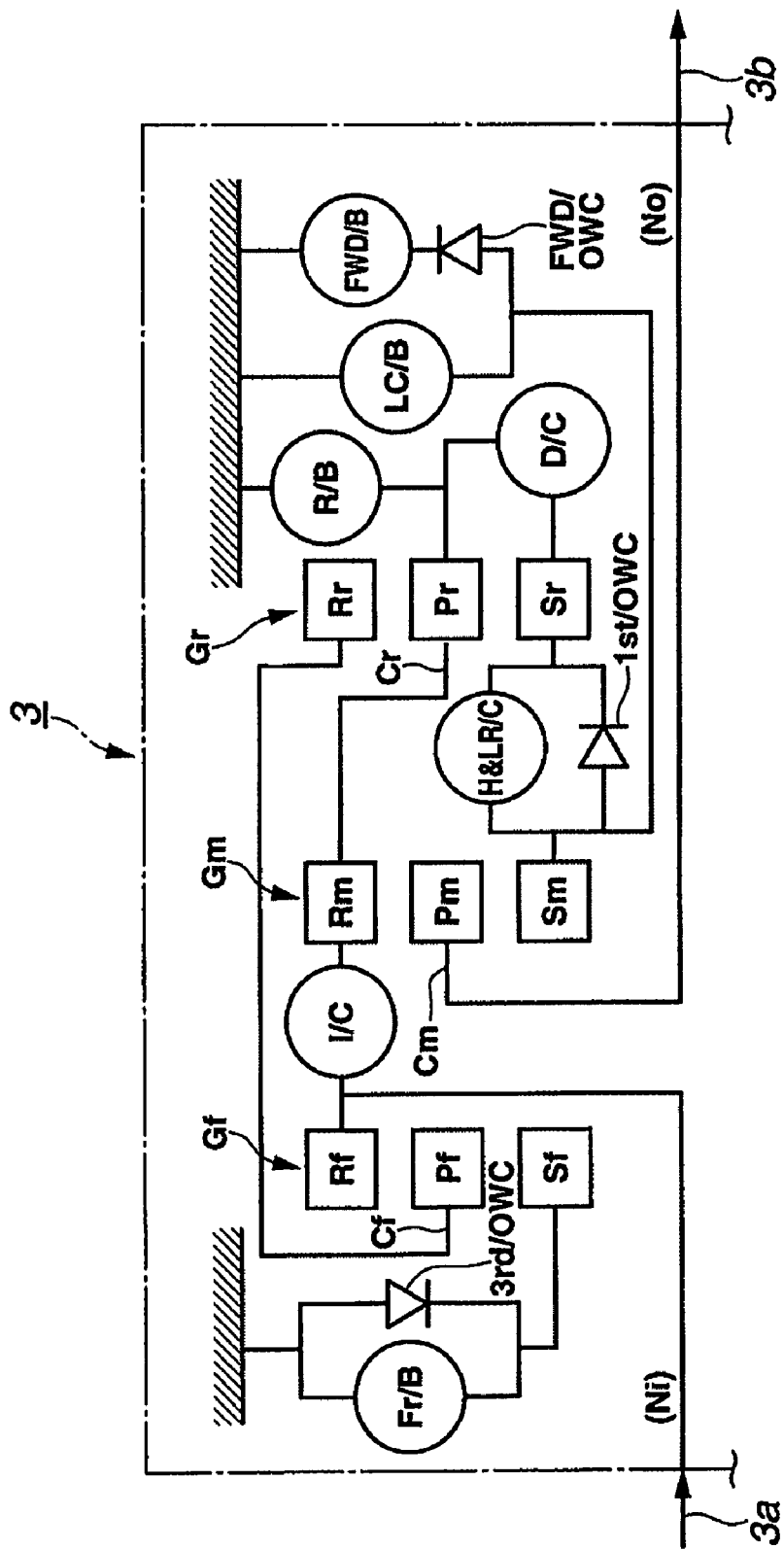
FIG. 4 is a skeleton diagram showing an automatic transmission in the powertrains of FIGS. 1 to 3.

The automatic transmission 3 is shown in FIG. 4. As shown in FIG. 4, the input shaft 3a and output shaft 3b are disposed so as to be coaxially abutted against each other. From the engine 1 side, a front planetary gear group Gf, a central planetary gear group Gm and a rear planetary gear group Gr are disposed in that order above the input shaft 3a and output shaft 3b.

The front planetary gear group Gf, which is closest to the engine 1, is a simple planetary gear group including a front sun gear Sf, a front ring gear Rf, a front pinion gear Pf that engages these gears Sf and Rf and a front carrier Cf that rotatably supports the front pinion Pf.

The center planetary gear group Gm, which is the next closest gear group to the engine 1, is a simple planetary gear group including a center sun gear Sm, a center ring gear Rm, a center pinion Pm that engages these gears Sm and Rm and a center carrier Cm that rotatably supports the center pinion Pm.

The rear planetary gear group Gr, which is furthest from the engine 1, is a simple planetary gear group including a rear sun gear Sr, a rear ring gear Rr, a rear pinion Pr that engages these gears Sr and Rr and a rear carrier Cr that rotatably supports the rear pinion Pr.

A front brake Fr/B, an input clutch I/C, a high-and-low-reverse clutch H&LR/C, a direct clutch D/C, a reverse brake R/B, a low-coast brake LC/B and a forward brake FWD/B are provided as transmission friction elements that determine a transmission path (shift gear) of the planetary gear transmission mechanism. These transmission friction elements along with three one-way clutches are brought into mutual relationship with planetary gear groups Gf, Gm and Gr as described below to form the planetary gear transmission mechanism of the automatic transmission 3. The three one-way clutches include a third-gear one-way clutch 3rd/OWC, a first-gear one-way clutch 1st/OWC and a forward one-way clutch FWD/OWC.

The front ring gear Rf is connected to the input shaft 3a, and the center ring gear Rm can be connected to the input shaft 3a as required by the input clutch I/C. The front sun gear Sf is prevented from rotating in a direction that is opposite to a direction of rotation of the engine 1 through the third-speed one-way clutch 3rd/OWC and can be fixed as appropriate by the front brake Fr/B that is disposed parallel to the third-speed one-way clutch 3rd/OWC. The front carrier Cf is connected to rear ring gear Rr, and the center ring gear Rm is connected to the rear carrier Cr.

The center carrier Cm is connected to the output shaft 3b. With regard to the center sun gear Sm and the rear sun gear Sr, the center sun gear Sm is prevented from rotating in a direction opposite to the direction of rotation of the engine 1 with respect to the rear sun gear Sr through the first-speed one-way clutch 1st/OWC, and the center sun gear Sm and the rear sun gear Sr can be connected to each other by the high-and-low reverse clutch H&LR/C.

The rear sun gear Sr and the rear carrier Cr can be connected to each other by the direct clutch D/C, and the rear carrier Cr can be fixed as appropriate by the reverse brake R/B.

The center sun gear Sm is further prevented from rotating in a direction opposite to the direction of rotation of the engine 1 by the forward brake FWD/B and the forward one-way clutch FWD/OWC when the forward brake FWD/B is engaged. In addition, the center sun gear Sm can be fixed as appropriate by the low-coast brake LC/B. Accordingly, the low-cost brake LC/B is provided in parallel with the forward brake FWD/B and the forward one-way clutch FWD/OWC.

A power transmission train of the planetary gear transmission mechanism can provide forward gears (that is, a forward first speed (1st gear), a forward second speed (2nd gear), a forward third speed (3rd gear), a forward fourth speed (4th gear) and a forward fifth speed (5th gear)) and a reverse shift gear (Rev) as a result of selective engagements. The selective engagements of the seven transmission friction elements Fr/B, D/C, I/C, H&LR/C, R/B, LC/B and FWD/B, and the three one-way clutches 3rd/OWC, 1st/OWC and FWD/OWC, are indicated by white circles and black circles (when engine braking) as shown in FIG. 5.

As shown in FIG. 5, the white, or clear, circles mean that the friction (or engagement) element (e.g., I/C or H&LR/C) is always engaged at that speed ratio. For example, H&LR/C at third speed gear ratio is a clear circle, which means that whether the vehicle is accelerating or coasting the H&LR/C clutch is engaged at the third speed gear ratio. In contrast, the friction element Fr/B at the third speed gear ratio is a black circle. This means that the friction element brake Fr/B disengages when the vehicle is accelerating (that is, the brake Fr/B is engaged when the vehicle is coasting with the engine brake.) As shown in FIG. 5, each of forward gears other than fourth gear employs a power transmission path including at least one one-way clutch (or unidirectional engagement element).

The powertrain includes an electric drive mode (EV mode). The EV mode is employed under low load and low vehicle speed conditions, such starting a stopped vehicle. When the EV mode is requested, the first clutch 6 is disengaged, and the second clutch 7 is engaged. When motor-generator 5 is driven under this condition, only output rotation from the motor-generator 5 is transmitted to the transmission input shaft 3a. Automatic transmission 3 changes the speed of the rotation towards the input shaft 3a in accordance with a selected gear and outputs this rotation from the transmission output shaft 3b. Thereafter, the rotation from the transmission output shaft 3b reaches the rear wheels 2 through the differential gear unit 8 so that the vehicle can be subjected to electric driving (EV driving) by only the motor-generator 5.

When a hybrid drive (HEV drive) mode is required, the first clutch 6 and the second clutch 7 are engaged, and the automatic transmission 3 is set in a power transmission state. The HEV mode is used when traveling at a high speed, when traveling under a high load, when the remaining amount of battery capacity is small, etc. In this state, output rotation from the engine, or the output rotation from the engine 1 and output rotation from the motor-generator 5, reach the transmission input shaft 3a so that the automatic transmission 3 changes the speed of the rotation towards the input shaft 3a in accordance with a selected gear and outputs this rotation from the transmission output shaft 3b. Thereafter, the rotation from the transmission output shaft 3b reaches the rear wheels 2 through the differential gear unit 8 so that the vehicle can be subjected to hybrid driving (HEV driving) by both the engine 1 and the motor-generator 5.

In the HEV driving, when there is excess energy when the engine 1 is operated at optimum fuel consumption, this excess energy is used to operate the motor-generator 5 as a generator so that the excess energy is converted into electrical power. By storing the generated power so as to be used for motor driving of the motor-generator 5, it is possible to improve the fuel consumption of the engine 1.

In FIG. 1, the second clutch 7 is arranged between motor-generator 5 and automatic transmission 3 for selectively connecting and disconnecting the motor-generator 5 to and from driving wheels 2. However, the second clutch 7 may be arranged between automatic transmission 3 and differential gear 8 as shown in FIG. 2 and serve similar functions.

Figure 2:
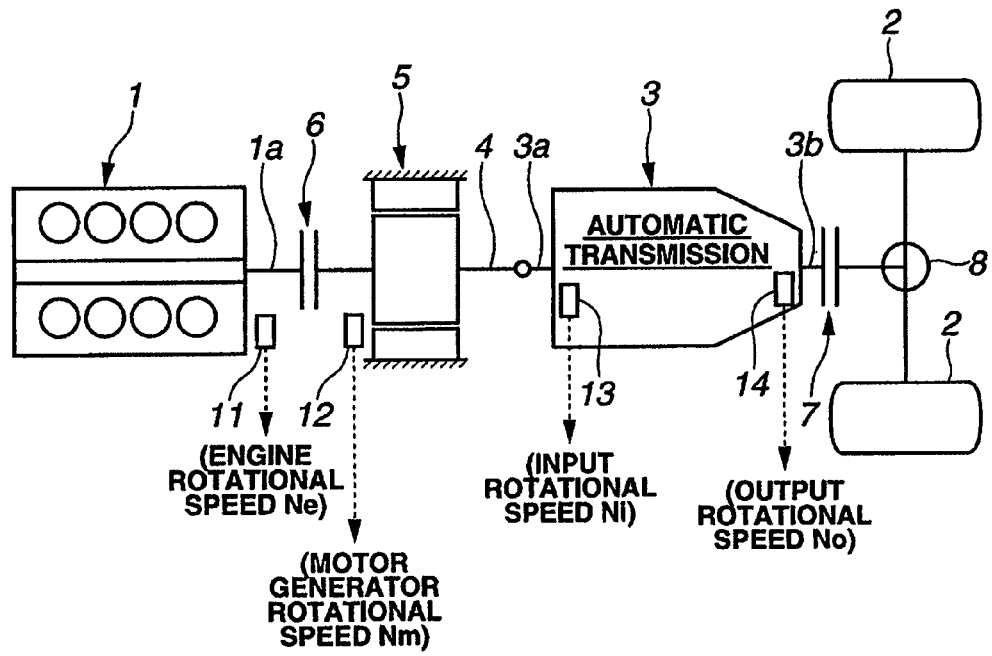
FIG. 2 is a schematic plan view of another hybrid vehicle powertrain to which the drive state shift controlling apparatus according to an embodiment of the invention is applicable.

In FIGS. 1 and 2, the second clutch 7 is added as a dedicated clutch in front of and behind the automatic transmission 3, respectively. However, the second clutch 7 may be a clutch used as a transmission friction element, which already exists in the automatic transmission 3, for selecting a forward gear or for selecting a reverse gear.

A transmission friction element of the automatic transmission 3 that is used as the second clutch 7 is described below.

In this case, in addition to performing the above-mentioned mode selection function, the second clutch 7 sets the automatic transmission in a power transmission state when it is engaged to achieve the function. Therefore, the structure shown in FIG. 3 is highly advantageous from the viewpoint of costs because a dedicated second clutch is not used.

Figure 3:
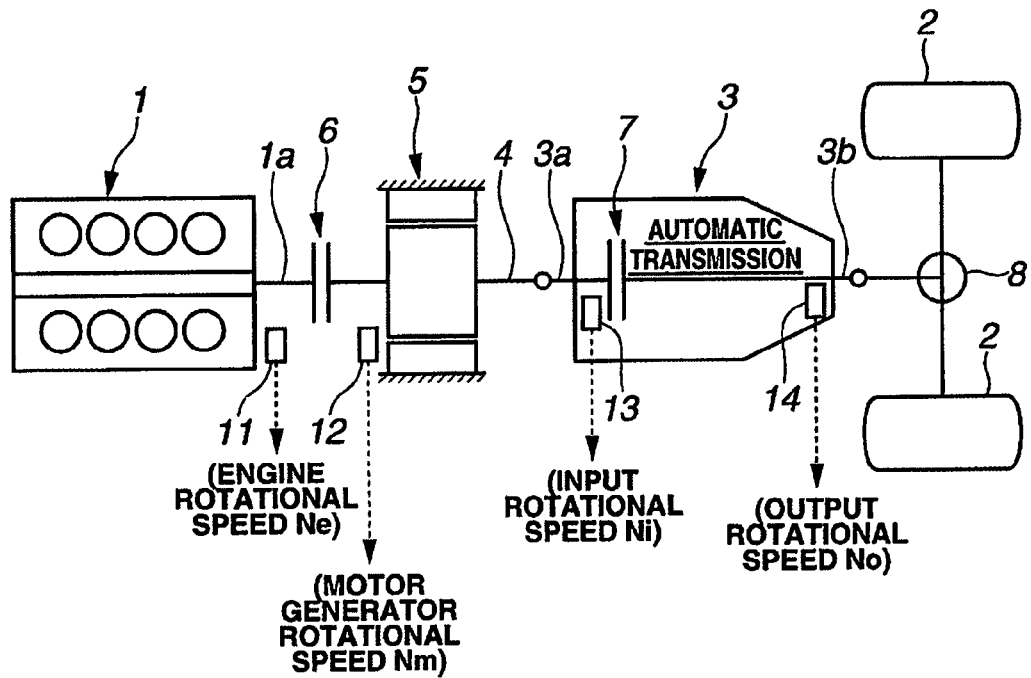
FIG. 3 is a schematic plan view of another hybrid vehicle powertrain to which the drive state shift controlling apparatus according to an embodiment of the invention is applicable.
Figure 6:
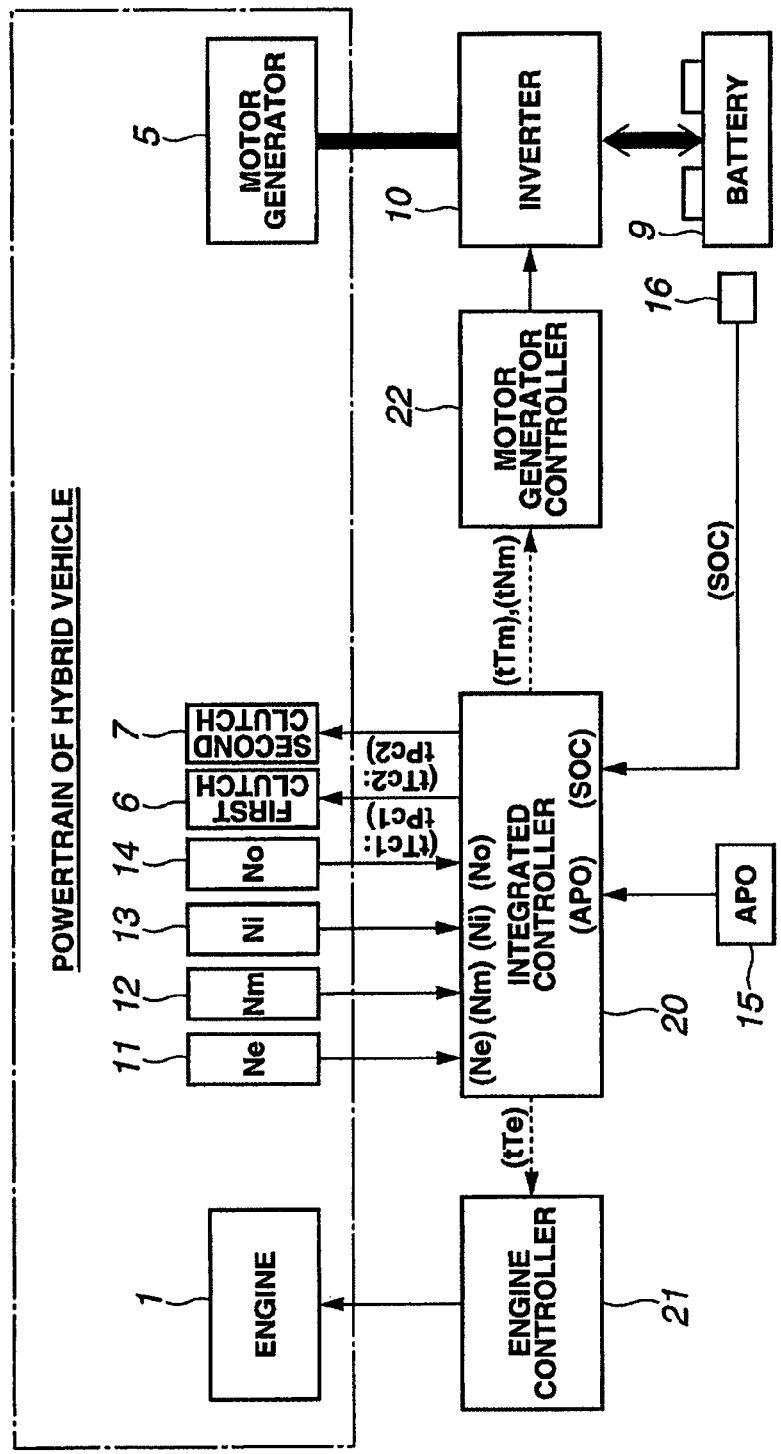
FIG. 6 is a block diagram showing a control system of the powertrain of FIG. 3.

The engine 1, the motor-generator 5, the first clutch 6 and the second clutch 7 of the powertrains of the hybrid vehicles shown in FIGS. 1 to 3 are controlled by a system shown in FIG. 6. In the description below, the powertrain shown in FIG. 3 (in which a transmission friction element that already exists in the automatic transmission 3 is the second clutch 7) is used.

The controlling system shown in FIG. 6 includes an integrated controller 20 that performs integration control of operation points of the powertrain. Each controller described herein, including the integrated controller 20, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed hereinafter. The functions of the integrated controller 20 described herein could be, for example, implemented in software as the executable programs, or could be implemented in whole or in part by separate hardware in the form of one or more integrated circuits (IC). Also, although the integrated controller 20 is shown as a separate device from the engine controller 21 and motor generator controller 22, the controllers can be implemented by a common device.

The operation points of the powertrain are defined by a target engine torque tTe, a target motor-generator torque tTm (or a target motor-generator rotational speed tNm), a target torque transfer capacity tTc1 (a first clutch command pressure tPc1) of the first clutch 6 and a target torque transfer capacity tTc2 (a second clutch command pressure tPc2) of the second clutch 7. To determine the operation points, several signals are input to the integrated controller 20. Namely, they are a signal from an engine rotation sensor 11 that detects an engine rotational speed Ne, a signal from a motor-generator rotation sensor 12 that detects a motor-generator rotational speed Nm, a signal from an input rotation sensor 13 that detects a transmission input rotational speed Ni, a signal from an output rotation sensor 14 that detects a transmission output rotational speed No, a signal from an accelerator opening sensor 15 that detects an accelerator pedal depression amount (accelerator opening APO) that indicates a requested load of the engine 1 and a signal from a storage state sensor 16 that detects a state of charge SOC (or electrical power that can be taken out) of a battery 9 that stores electrical power for the motor-generator 5.

Among these sensors, the engine rotation sensor 11, the motor-generator rotation sensor 12, the input rotation sensor 13 and the output rotation sensor 14 may be disposed as shown in FIGS. 1 to 3.

From the accelerator opening APO, the battery state of charge SOC and the transmission output rotational speed No (vehicle speed VSP), the integrated controller 20 selects a drive mode (EV mode or HEV mode) that can realize driving force of the vehicle that is desired by a driver. In addition, the integrated controller 20 calculates the target engine torque tTe, the target motor-generator torque tTM (or the target motor-generator rotational speed tNm), the target first clutch torque transfer capacity tTc1 (first clutch command pressure tPc1) and the target second clutch torque transfer capacity tTc2 (second clutch command pressure tPc2).

The target engine torque tTe is supplied to an engine controller 21, and the target motor-generator torque tTm (or target motor-generator rotational speed tNm) is supplied to a motor-generator controller 22. The engine controller 21 controls the engine 1 so that an engine torque Te becomes equal to the target engine torque tTe. The motor-generator controller 22 controls the motor-generator 5 through the battery 9 and an inverter 10 so that a torque Tm (or rotational speed Nm) of the motor-generator 5 becomes equal to the target motor-generator torque tTm (or target motor-generator rotational speed tNm).

The integrated controller 20 supplies solenoid electrical currents, which are in accordance with the target first clutch torque transfer capacity tTc1 (first clutch command pressure tPc1) and the target second clutch torque transfer capacity tTc2 (second clutch command pressure tPc2), to hydraulic control solenoids (not shown) of the first clutch 6 and the second clutch 7. The solenoid electrical currents are supplied to control engagement strengths of the respective first clutch 6 and the second clutch 7 so that a torque transfer capacity Tc1 (first clutch pressure Pc1) of the first clutch 6 becomes equal to the target torque transfer capacity tTc1 (first clutch command pressure tPc1) and a torque transfer capacity Tc2 (second clutch pressure Pc2) of the second clutch 7 becomes equal to the target second clutch torque transfer capacity tTc2 (second clutch command pressure tPc2).

Figure 7:
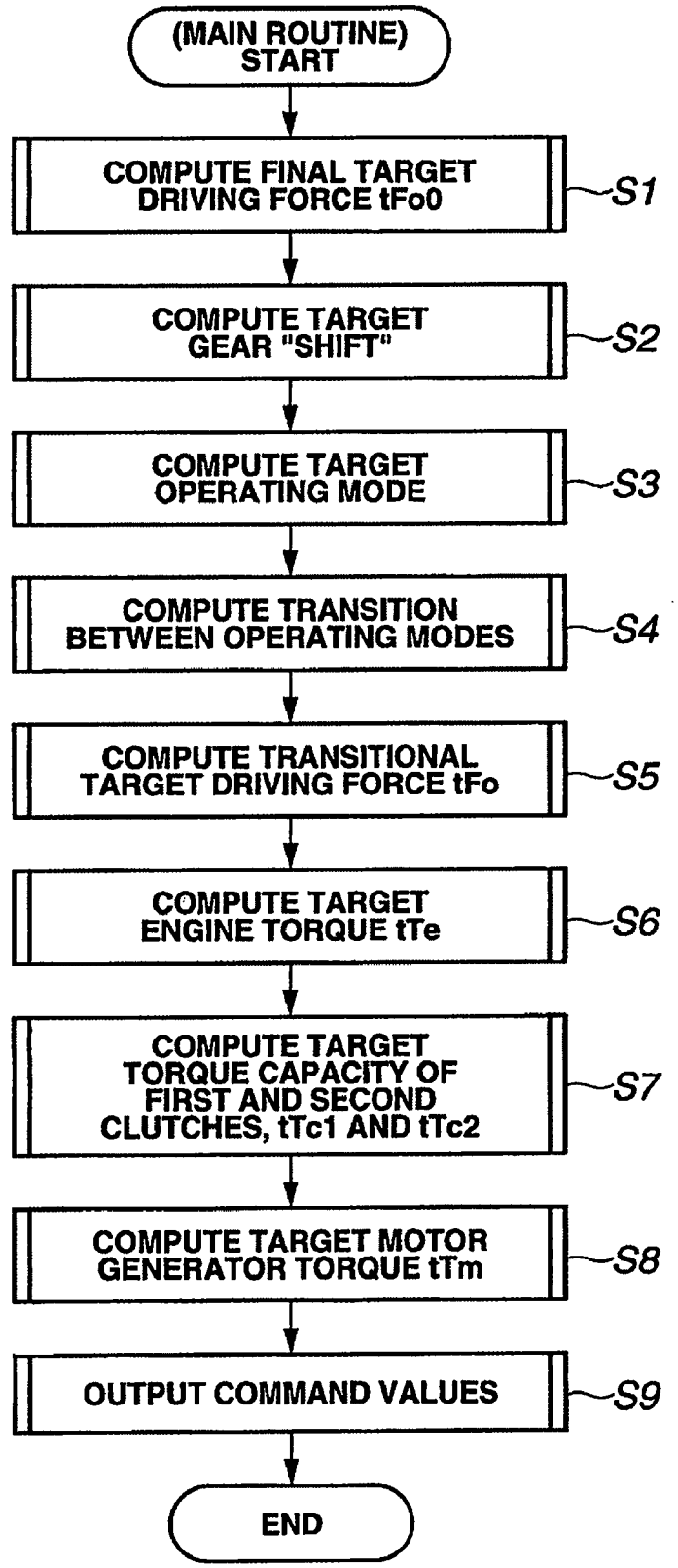
FIG. 7 is a flow chart showing a program of a basic driving force control that is carried out by an integrated controller of the control system.

By a main routine illustrated in FIG. 7, the integrated controller 20 selects the drive mode (EV mode or HEV mode) and calculates the target engine torque tTe, the target motor-generator torque tTm (or the target motor-generator rotational speed tNm), the target first clutch torque transfer capacity tTc1 (first clutch command pressure tPc1) and the target second clutch torque transfer capacity tTc2 (second clutch command pressure tPc2).

First, in step S1 a steady target driving force tFo0 is calculated from the accelerator opening APO and the vehicle speed VSP using a scheduled target driving force map as is known from the art.

In step S2 a target gear SHIFT is next determined from the accelerator opening APO and the vehicle speed VSP based on a scheduled gear shift map. Then, in step S9 a command of the determination is given to a gear-shift controlling unit (not shown) of the automatic transmission 3 to shift the gear of the automatic transmission 3 to the target gear SHIFT.

In step S3, a target drive mode (EV mode or HEV mode) is determined from the accelerator opening APO and the vehicle speed VSP using a scheduled target drive mode area map. The target drive mode area map is determined so that, usually, the target drive mode is the HEV mode when the load is high (e.g., the accelerator opening is large) and the speed is high, and the target drive mode is the EV mode when the load and speed are low.

A drive mode transition is calculated as follows by comparing a current drive mode and the target drive mode with each other in the next step S4. If the current drive mode and the target drive mode are the same, a command is given to maintain the current drive mode (EV mode or HEV mode). If the current drive mode is the EV mode, and the target drive mode is the HEV mode, a command is given to perform mode switching from the EV mode to the HEV mode. If the current drive mode is the HEV mode, and the target drive mode is the EV mode, a command is given to perform mode switching from the HEV mode to the EV mode.

Then, the appropriate command is output in step S9 to maintain or switch the mode in accordance with the command.

In step S5 a transitional target driving force tFo of each time, which is required for converting with a predetermined response to the target driving force tFo0 obtained in step S1, is calculated from a current driving force.

In calculating the transitional target driving force tFo, for example, an output that is obtained as a result of passing the target driving force tFo0 through a low-pass filter with a predetermined time constant may be used as the transitional target driving force tFo.

In step S6, in accordance with the drive mode (EV mode or HEV mode) or the mode switching, the target engine torque tTe that is required for achieving the transitional target driving force tFo with or without the cooperation of the motor-generator 5 is determined from the transitional target driving force tFo, a tire effective radius Rt of each driving wheel 2, a final gear ratio if, a gear ratio iG of the automatic transmission 3 determined by a currently selected gear, the input rotational speed Ni of the automatic transmission 3, the engine rotational speed Ne and a target discharge power tP in accordance with the battery state of charge SOC.

In step S9 a command regarding the target engine torque tTe that has been determined in this way is given to the engine controller 21 shown in FIG. 7 to cause the engine controller 21 to control the engine 1 so that the target engine torque tTe is achieved.

In step S7, the target torque transfer capacity tTc1 (clutch command pressure tPc1) of the first clutch 6 and the target torque transfer capacity tTc2 (clutch command pressure tPc2) of the second clutch 7, required for executing the mode switching or required for achieving the transitional target driving force tFo, are determined in accordance with the drive mode (EV mode or HEV mode) or the mode switching.

In step S9 commands regarding the target torque transfer capacity tTc1 (clutch command pressure tPc1) of the first clutch 6 and the target torque transfer capacity tTc2 (clutch command pressure tPc2) of the second clutch 7 that have been determined in this way are given to the first clutch 6 and the second clutch 7 shown in FIG. 6 to control the engagement strengths of the first clutch 6 and the second clutch 7 so that the target transfer torque capacities tTc1 and tTc2 are achieved.

In step S8, in accordance with the drive mode (EV mode or HEV mode) or the mode switching, the target motor-generator torque tTm that is required for achieving the transitional target driving force tFo with or without the cooperation of the engine 1 is determined from the transitional target driving force tFo, the tire effective radius Rt of each driving wheel 2, the final gear ratio if, the gear ratio iG of the automatic transmission 3 determined by the currently selected gear, the input rotational speed Ni of the automatic transmission 3, the engine rotational speed Ne and the target discharge power tP in accordance with the battery state of charge SOC.

In step S9 a command regarding the target motor-generator torque tTm that has been determined in this way is given to the motor-generator controller 22 shown in FIG. 7 to cause the motor-generator controller 22 to control the motor-generator 5 so that the target motor-generator torque tTm is achieved.

The foregoing gives a description of a general controlling operation of driving force of a powertrain of a hybrid vehicle. Embodiments of the invention that perform an HEV-to-EV-mode switching controlling operation are next described for a case in which, as illustrated in FIG. 8, the accelerator opening APO is reduced due to the driver taking his/her foot off an accelerator pedal, so that a command for mode switching from the HEV mode to the EV mode is generated and upshifting of the automatic transmission 3 from the fourth speed to the fifth speed is performed.

In the HEV-to-EV-mode switching as described above, the hybrid drive (HEV) mode in which the first clutch 6 and the second clutch 7 are engaged for driving the wheels 2 by the power from the engine 1 and the motor-generator 5 is switched to the electric drive (EV) mode in which the first clutch 6 is disengaged and the engine 1 is stopped for driving the wheels 2 only by the power from the motor-generator 5. Accordingly, the HEV-to-EV-mode switching is performed by disengaging the first clutch 6 and stopping the engine 1.

The upshifting from the fourth speed to the fifth speed of the automatic transmission 3 is, as indicated by arrows in the engagement logic diagram of FIG. 5, achieved by disengaging the engaged direct clutch D/C (called "disengagement element" or "to-be-disengaged element") and engaging the disengaged front brake Fr/B (called "engagement element" or "to-be-engaged element"). Accordingly, here the direct clutch D/C (disengagement element) is used as the second clutch 7 shown in FIG. 3, and its command (or target) pressure is represented by tPc2 and its actual pressure is represented by Pc2.

In addition, in FIG. 8, a command (or target) pressure of the front brake Fr/B (engagement element) is represented by tPc, its actual pressure is represented by Pc, and its torque transfer capacity is represented by Tc. FIG. 8 also shows that a torque transfer capacity of the high-and-low reverse clutch H&LR/C, which remains engaged during the upshifting from the fourth speed to the fifth speed as is clear from FIG. 5, is given along with the torque Te of the engine 1, the torque Tm of the motor-generator 5, the engine rotational speed Ne, the motor-generator rotational speed Nm and a transmission output torque To.

Still further, in FIG. 8 the command (or target) pressure of the first clutch 6 shown in FIG. 3 is represented by tPc1, its actual pressure is represented by Pc1 and its torque transfer capacity is represented by Tc1. However, the first clutch 6 is engaged so that its torque transfer capacity Tc1 is at its maximum value in its ordinary state, and its torque transfer capacity Tc1 is reduced as the actual pressure Pc1, which is controlled so as to approach the command pressure tPc1, increases.

At moment t1 in which a fourth-to-fifth-speed upshift command is generated due to a reduction in the accelerator opening APO (requested driving force) shown in FIG. 8, the command (or target) pressure tPc2 of the direct clutch D/C (disengagement element) used as the second clutch 7 at this time is theoretically immediately set to 0 although there is a slight response delay. This causes the actual pressure Pc2 of the direct clutch D/C (disengagement element) to be controlled so as to follow the command pressure tPc2 by a delay in operation of hardware, so that the direct clutch D/C (disengagement element) is disengaged as soon as possible after moment t1.

In contrast, the engagement of the front brake Fr/B (engagement element) is not yet executed, so that the automatic transmission 3 is set in a neutral state in which power cannot be transmitted.

A further reduction in the accelerator opening APO (requested driving force) shown in FIG. 8 causes an HEV-to-EV-mode switching command to be generated at moment t2 so that at moment t3 a determination is made that the accelerator opening APO=0 (idling state). At moment t4, reached when a predetermined time TM1 elapses from moment t2, the command pressure tPc1 of the first clutch 6 is theoretically immediately set at its maximum value although there is a slight delay in response.

As a result, the actual pressure Pc1 of the first clutch 6 is controlled so as to follow the command pressure tPc1 by a delay in operation of hardware, and the torque transfer capacity Tc1 of the first clutch 6 is reduced as shown in FIG. 8 so that an illustrated slip start point is passed, and the first clutch 6 is finally disengaged.

From moment t5, reached when a predetermined time TM2 elapses from the moment t2, the engine torque Te that has been controlled in accordance with the accelerator opening APO up to this time is reduced at an instant by stopping the engine by a fuel cut (fuel supply stoppage), so that the engine is stopped as indicated by a change in the engine rotational speed Ne with time.

The predetermined times TM1 and TM2 are scheduled times that are mutually related to each other so that the first clutch 6 is disengaged after the engine torque Te that is set when operating the engine is lost by stopping the engine 1 (that is, when a positive engine torque is lost in FIG. 8). (In FIG. 8, moment t6 when it is determined that the first clutch 6 is disengaged and moment t7 when the first clutch 6 is disengaged are shown.)

At moment t5, a rotation synchronization is started in parallel with the above engine stop operation, thereby preventing gear shift shock. Specifically, the motor-generator 5 decreases its rotational speed on the input side for the fourth-to-fifth upshift of automatic transmission 3. The rotation synchronization is implemented by reducing the rotational speed Nm of motor-generator 5 from a before-gearshift rotational speed (indicated by "rotational speed in fourth gear" in FIG. 8) to a predetermined rotational speed close to an after-gearshift rotational speed (indicated by "rotational speed in fifth gear" in FIG. 8) during the interval from moment t5 to moment t8. Moment t8 is reached when a target gear-shift time (see FIG. 8), previously set for preventing gear-shift shock, elapses from moment t5. The rotation synchronization is ended at moment t8 when the rotational speed Nm has approached the after-gear-shift rotational speed (fifth-speed rotational speed in FIG. 8) with a margin.

The rotation synchronization may control the rotational speed Nm of motor-generator 5 so that the effective gear ratio changes from a before-gearshift gear ratio (fourth gear ratio) to a gear ratio close to an after-gearshift gear ratio (fifth gear ratio) during the time interval from moment t5 to moment t8.

Rotation synchronization is terminated at moment t8. As shown in FIG. 8, as the motor-generator torque Tm of motor-generator 5 changes with time, the motor-generator frictional torque Tm of motor-generator 5 is decreased gradually toward zero (target motor-generator torque where the requested driving force is equal to zero when the accelerator opening APO is equal to zero) during the time interval from moment t8 to moment t9. This is done to achieve smooth engagement of the third-gear one-way clutch 3rd/OWC for fourth-to-fifth gear shift (as shown in FIG. 5). The time interval from moment t8 to moment t9 is the "subsequent stage."

The predetermined time TM3 is a scheduled time that is previously set as a time required for a friction torque Tm of the motor-generator 5 to disappear with the progress of the engagement of the front brake Fr/B (engagement element), that is, the progress of the upshifting from the fourth speed to the fifth speed.

The foregoing describes controlling the torque of motor-generator 5 for smooth engagement of third-gear one-way clutch 3rd/OWC during upshifting during time interval from moment t8 to t9. Alternatively, the rotational speed Nm of motor-generator 5 may be changed toward the after-gearshift rotational speed for the same purpose.

The engagement of third-gear one-way clutch 3rd/OWC with the disengagement of direct clutch D/C (disengagement element) prior to the engagement of front brake Fr/B (engagement element) serves to upshift the automatic transmission 3 from fourth gear to fifth gear.

At moment t5 when engine stop is commanded, the command pressure tPc of front brake Fr/B (engagement element) starts to increase as shown in FIG. 8. Until moment t8, the command pressure tPc is set to a small value allowing the actual pressure Pc to cause a loss stroke of front brake Fr/B (engagement element) against a return spring. Thus, the front brake Fr/B (engagement element) is readied for engagement to minimize the length of operation.

At moment t8 when rotation synchronization is terminated, the command pressure tPc of front brake Fr/B (engagement element) is set to the maximum value. The actual pressure Pc follows the command pressure tPc with a hardware-specific response delay. Upon this change, the torque capacity Tc of front brake Fr/B (engagement element) is increased as shown in FIG. 8. Thus, the engagement of front brake Fr/B holds the automatic transmission 3 in fifth gear after upshift by third-gear one-way clutch 3rd/OWC.

At moment t9 when the motor-generator torque Tm is reduced to zero, the motor-generator torque Tm is conformed to a torque value corresponding to the accelerator opening APO. In FIG. 8 the torque value is a negative value when the accelerator opening APO is equal to zero. This generates a regenerative braking torque.

At moment t10 the torque Tm of motor-generator 5 conforms to a torque value corresponding to an after-gearshift and after-mode-shift driving force. At moment t10 the HEV-to-EV mode shift with the fourth-to-fifth gear shift is completed. After moment t9 the motor-generator 5 generates electric energy because the accelerator opening APO is equal to zero, and the after-gearshift and after-mode-shift driving force is equal to a negative value (request for engine braking).

During the fourth-to-fifth upshift of the automatic transmission 3 the high-and-low-reverse clutch H&LR/C is engaged. Before moment t10, the torque capacity of high-and-low-reverse clutch H&LR/C transmits the torque from both of engine 1 and motor-generator 5 as in the HEV mode. Moment t10 occurs when the torque Tm of motor-generator 5 is equal to a torque value of the after-gearshift and after-mode-shift driving force. After moment t10 the torque capacity of high-and-low-reverse clutch H&LR/C transmits the torque from motor-generator 5 as in the EV mode.

FIG. 9 is another expression of the drive state shift control of FIG. 8, where both the HEV-to-EV mode shift and the fourth-to-fifth gear shift are performed. Specifically, at stage I a fourth-to-fifth upshift is requested in response to the accelerator opening APO going to zero in the HEV mode. In response to the gear shift request, the direct clutch D/C (disengagement element) is disengaged.

At stage II an HEV-to-EV mode shift (engine stop) is requested in response to the accelerator opening APO dropping to zero. First clutch 6 begins disengagement when the predetermined time interval TM1 has elapsed from the request for HEV-to-EV mode shift. At stage III the engine 1 stoppage begins due to a fuel supply stop (fuel cut, F/C) when the predetermined time interval TM2 has elapsed from the request for HEV-to-EV mode shift. Further, the front brake Fr/B (engagement element) is readied for engagement by precharge and standby control. When the fuel supply is stopped (fuel cut, F/C), the rotational speed Nm of motor-generator 5 starts to decrease from the before-gearshift rotational speed to a predetermined rotational speed close to the after-gearshift rotational speed (after-gearshift rotational speed ±α).

At stage IV the torque of motor-generator 5 is controlled for compensation after the motor-generator rotational speed reaches a predetermined speed close to the after-gearshift rotational speed (that is, ±α). The torque of motor-generator 5 is controlled to compensate for engine torque Te until first clutch 6 starts to slip because the engine torque Te is smaller than the torque capacity Tc1 of first clutch 6. Then, after the first clutch 6 starts to slip, the torque of motor-generator 5 is controlled to compensate for torque capacity Tc1 of first clutch 6 until first clutch 6 is disengaged because torque capacity Tc1 of first clutch 6 is smaller than engine torque Te.

The drive state shift control of FIGS. 8 and 9, where both of the HEV-to-EV mode shift and the fourth-to-fifth gear shift are performed, produces the following operations and advantageous effects. In the prior stage from moment t5 to moment t8 in FIG. 8, the motor-generator rotational speed Nm of motor-generator 5 is controlled to conform to a predetermined rotational speed close to the after-gearshift rotational speed. This allows the third-gear one-way clutch 3rd/OWC (unidirectional engagement element) to be ready for engagement.

In the subsequent stage from moment t8 to moment t9, the torque or rotational speed of motor-generator 5 is controlled so as to smoothly engage the third-gear one-way clutch 3rd/OWC (unidirectional engagement element). This prevents a shock when the unidirectional engagement element engages.

In the above embodiment, the drive state shift control may be applied to a drive state shift including both of an EV-to-HEV mode shift and a fifth-to-fourth gear shift, and to a mode shift where the transmission is held in a gear with engagement of a one-way clutch. Naturally, this produces similar operations and advantageous effects.

In the above embodiments, the following further operations and advantageous effects may be realized. The mode shift from the HEV mode to the EV mode is implemented by stopping the engine 1 and disengaging the first clutch 6. During the mode shift, the torque capacity of second clutch 7 (direct clutch D/C) is reduced so that the second clutch 7 can absorb a shock due to engine stop (fluctuations in engine torque Te as indicated by the hatching pattern in FIG. 8). As shown in FIG. 8, the torque capacity of direct clutch D/C (second clutch 7) is set to zero. Second clutch 7 is disposed in the driveline between first clutch 6 and driving wheels 2. If the timing of disengagement of first clutch 6 is delayed after the stop of engine 1, it is necessary to stop the engine 1 while the torque capacity Tc1 of first clutch 6 is larger than engine torque Te. In the disclosed embodiments, the torque fluctuations due to engine stop are absorbed by a slip of second clutch 7 (direct clutch D/C). As shown in FIG. 8, the transmission output torque To is held to be zero. Thus, it is possible to prevent shocks due to engine stop.

Further, compensating for the torque of motor-generator 5 is unnecessary, because the shock due to engine stop is prevented. Accordingly, it is unnecessary to determine the timing and quantity of the torque compensation, making shock prevention simple and reliable.

If disengagement of first clutch 6 happens prior to the stop of engine 1, the torque capacity of first clutch 6 is reduced below engine torque Te if the engine 1 is still rotating to generate a positive driving torque even during engine stop operation (fuel cut, as an example). In such cases, the engine rotates at idle due to the positive driving torque, making the driver feel uncomfortable. As described above, the embodiments perform the HEV-to-EV mode shift so as not to cause engine rotation at idle as shown in FIG. 8.

In the disclosed embodiments, the torque capacity of second clutch 7 (direct clutch D/C) is reduced so that the second clutch 7 can absorb a shock due to engine stop (fluctuations in engine torque Te as indicated by the hatching pattern in FIG. 8). As shown in FIG. 8, the torque capacity of direct clutch D/C (here, second clutch 7) is set to zero. Under the foregoing condition, a rotation synchronization of the motor-generator 5 is performed to prevent gear shift shocks during the fourth-to-fifth upshift. The rotation synchronization of motor-generator 5 is performed independently of transmission output torque To and motor-generator torque Tm. Therefore, the engine stop operation (mode shift) and the rotation synchronization (gear shift control) can be performed in parallel, making it possible to complete in a short time interval both the HEV-to-EV mode shift and the gear shift.

As described, the first clutch 6 is disengaged after the engine torque Te vanishes. This is implemented by stopping the engine 1 depending on time intervals (predetermined time intervals TM1 and TM2) measured from the moment t2 when the HEV-to-EV mode shift is requested. This prevents the torque capacity of first clutch 6 from falling below the engine torque Te while the engine 1 is still generating a positive driving torque even during engine stop operation (i.e., fuel cut in these embodiments). The engine rotational speed no longer rotates at idle due to the positive driving torque so the driver does not feel uncomfortable.

As described above, the fourth-to-fifth upshift of automatic transmission 3 is implemented by a shift in engagement between friction elements, i.e., by disengaging the engaged direct clutch D/C and engaging the disengaged front brake Fr/B. Direct clutch D/C (disengagement element) can be used as the second clutch 7 as shown in FIG. 3. Thus, it is unnecessary to separately provide the second clutch 7 as shown in FIGS. 1 and 2. This is advantageous for cost and space utility.

Where the HEV-to-EV mode shift with gear shift requires no shift in engagement between friction elements, or where the HEV-to-EV mode shift is done without gear shift, the shifting friction element that would maintain the automatic transmission in a state allowing power transmission may be used as second clutch 7. This produces similar operations and advantageous effects without separately providing second clutch 7. For example, the high-and-low-reverse clutch H&LR/C may be used as second clutch 7 of FIG. 3. This is because high-and-low-reverse clutch H&LR/C is engaged in every gear other than second gear as shown in FIG. 5, which shows the engagement logic of automatic transmission 3. During the HEV-to-EV mode shift the high-and-low-reverse clutch H&LR/C is disengaged or the torque capacity thereof is reduced so as to produce the above advantageous effects.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A drive state shift control apparatus for a vehicle, comprising:
   a motor-generator;
   a unidirectional engagement element disposed between the motor-generator and the driving wheel configured for automatic engagement in response to driving torque in one direction; and
   a controller operable to:
      control a rotational speed of the motor-generator so that a rotational speed of an upstream side of the unidirectional engagement element in a direction of driving power transmission substantially conforms to a rotational speed of a downstream side thereof when a difference between the rotational speeds is ±α wherein α is a predetermined number greater than zero when the unidirectional engagement element is engaged in response to a shift in a driving power transmission path; and
      gradually control the difference toward zero.

2. The apparatus according to claim 1, further comprising:
   a clutch disposed between the motor-generator and a driving wheel for engagement and disengagement; and
   wherein the controller is further operable to:
      shift the clutch into a disengaged state from an engaged state transmitting a driving torque; and
      control the rotational speed of the motor-generator so that the rotational speed of the upstream side of the unidirectional engagement element in the direction of driving power transmission substantially conforms to the rotational speed of a downstream side thereof when the unidirectional engagement element is engaged in response to the shift in a driving power transmission path after the clutch is shifted into the disengaged state.

3. The apparatus according to claim 2 wherein the controller is further operable to shift the clutch into the disengaged state from the engaged state responsive to an upshift at a time of a release of an accelerator pedal.

4. The apparatus according to claim 1 wherein the unidirectional engagement element is a one-way clutch.

5. The apparatus according to claim 1 wherein the controller is further operable to gradually control the difference toward zero by controlling an output torque of the motor-generator to conform to a requested vehicle driving force according to a vehicle operating state.

6. The apparatus according to claim 1 wherein the controller is further operable to gradually control the difference toward zero by using a rotational speed control to control the difference to change to zero at a predetermined gradient.

7. The apparatus according to claim 1, further comprising:
   an engine; and
   a transmission in tandem with the engine and the motor-generator; and
   a first clutch between the engine and the motor-generator, wherein the shift in driving power transmission path is a shift from a hybrid drive in which the first clutch is engaged to an electric drive in which the first clutch is disengaged.

8. The apparatus according to claim 1 wherein the driving torque in the one direction is a driving torque in a direction to rotate the motor-generator by the driving wheel.

9. The apparatus according to claim 1, further comprising:
   an engine; and a transmission in tandem with the engine and the motor-generator; and wherein the unidirectional engagement element is located within the transmission.

10. The apparatus according to claim 9, further comprising:
a first clutch between the engine and the motor-generator, wherein the shift in driving power transmission path is a shift from a hybrid drive in which the first clutch is engaged to an electric drive in which the first clutch is disengaged.

11. The apparatus according to claim 9 wherein the driving torque in the one direction is a driving torque in a direction to rotate the motor-generator by the driving wheel.

12. The apparatus according to claim 1, further comprising:
an engine; and
a transmission in tandem with the engine and the motor-generator; and
a first clutch between the engine and the motor-generator, wherein the shift in driving power transmission path is a shift from a hybrid drive in which the first clutch is engaged to an electric drive in which the first clutch is disengaged.

13. The apparatus according to claim 12 wherein the unidirectional engagement element is within the transmission.

14. The apparatus according to claim 12 wherein the driving torque in the one direction is a driving torque in a direction to rotate the motor-generator by the driving wheel.

15. The apparatus according to claim 12, further comprising:
a second clutch disposed between the motor-generator and the driving wheel; and
wherein the controller is further operable to:
initiate disengagement of the second clutch after receiving an up-shift command;
initiate disengagement of the first clutch after receiving an engine stop command;
carry out the engine stop command in a first time interval while starting the control of the rotational speed of the motor-generator and completing disengagement of second clutch; and
begin control of a motor torque of the motor-generator once a difference between the rotational speed of the upstream side of the unidirectional engagement element in the direction of driving power transmission and the rotational speed of the downstream side thereof is ±α wherein α is a predetermined number greater than zero to compensate for an estimated engine torque after the first clutch begins to slip and to compensate for torque capacity of the first clutch until the first clutch is disengaged.

16. The apparatus according to claim 15 wherein the engine stop command is due to a cut in a fuel supply.

17. A controller for a drive state shift control apparatus for a vehicle, the vehicle including a motor-generator, a driving wheel and a clutch disposed between the motor-generator and a driving wheel for engagement and disengagement, the controller comprising:
means for shifting a driving power transmission path;
means for shifting the clutch into a disengaged state from an engaged state transmitting a driving torque responsive to an upshift at a time of a release of an accelerator pedal; and
means for controlling a rotational speed of the motor-generator so that a rotational speed of an upstream side of a unidirectional engagement element in a direction of driving power transmission substantially conforms to a rotational speed of a downstream side thereof when the unidirectional engagement element is engaged in response to a shift in the driving power transmission path after the clutch is shifted into the disengaged state, the unidirectional engagement element disposed between the motor-generator and the driving wheel configured for automatic engagement in response to driving torque in one direction.

18. A drive state shift control method for a vehicle, the vehicle including a motor-generator and a driving wheel, the method comprising:
shifting a driving power transmission path;
controlling a rotational speed of the motor-generator so that a rotational speed of an upstream side of a unidirectional engagement element in a direction of driving power transmission substantially conforms to a rotational speed of a downstream side thereof when a difference between the rotational speeds is ±α wherein α is a predetermined number greater than zero when the unidirectional engagement element is engaged in response to shifting the driving power transmission path, the unidirectional engagement element disposed between the motor-generator and the driving wheel configured for automatic engagement in response to driving torque in one direction; and
gradually controlling the difference toward zero.

19. The method according to claim 18 wherein gradually controlling the difference toward zero further comprises controlling an output torque of the motor-generator to conform to a requested vehicle driving force according to a vehicle operating state.

* * * * *